May 2, 1933.   L. M. HILE   1,906,795
MACHINE FOR MAKING AND INSERTING BASKET HANDLES
Filed Sept. 8, 1931   7 Sheets-Sheet 4
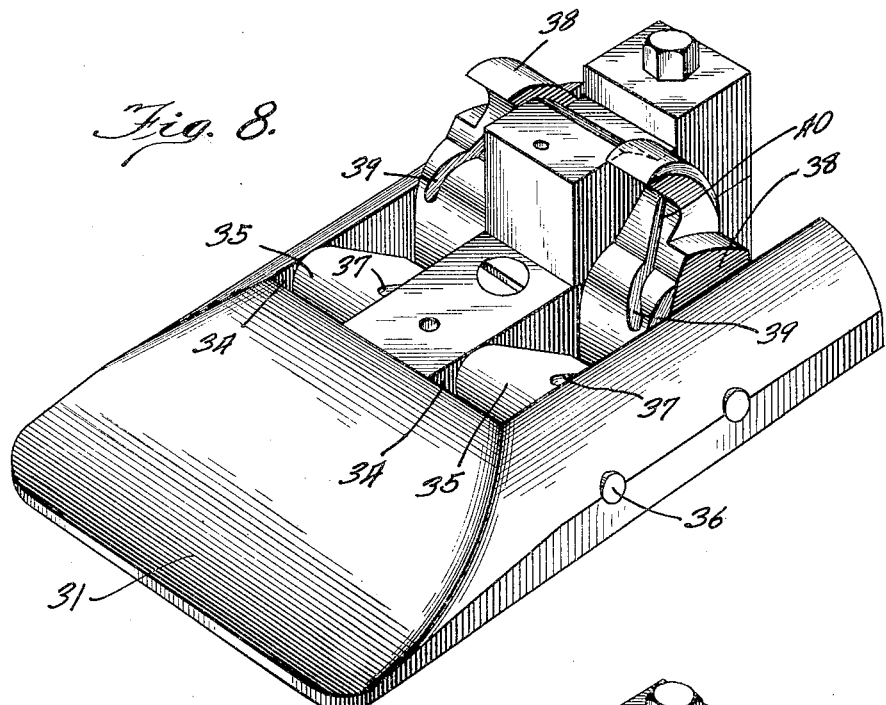
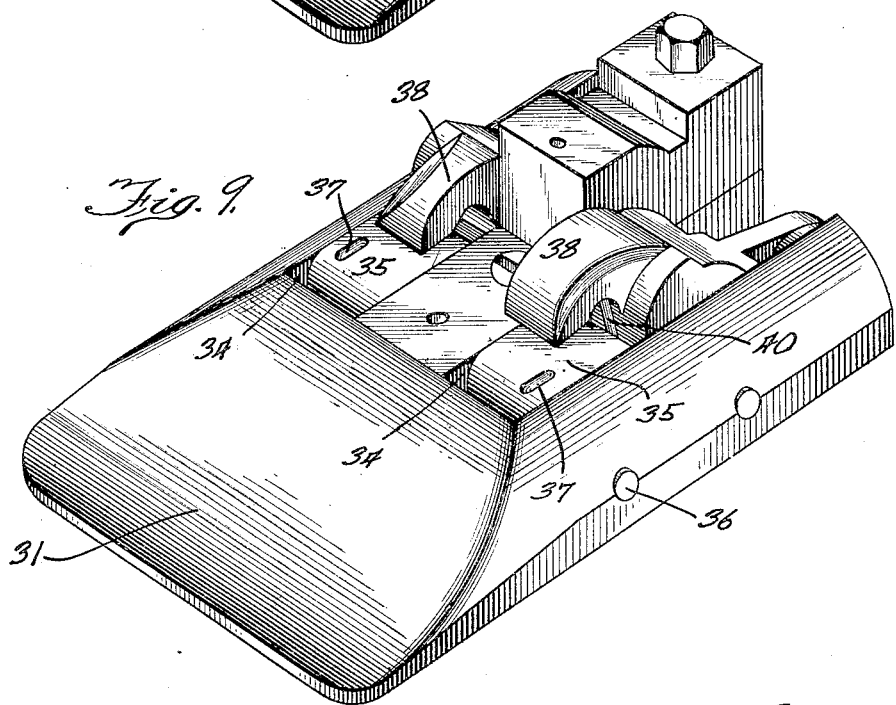
Inventor:
Leslie M. Hile

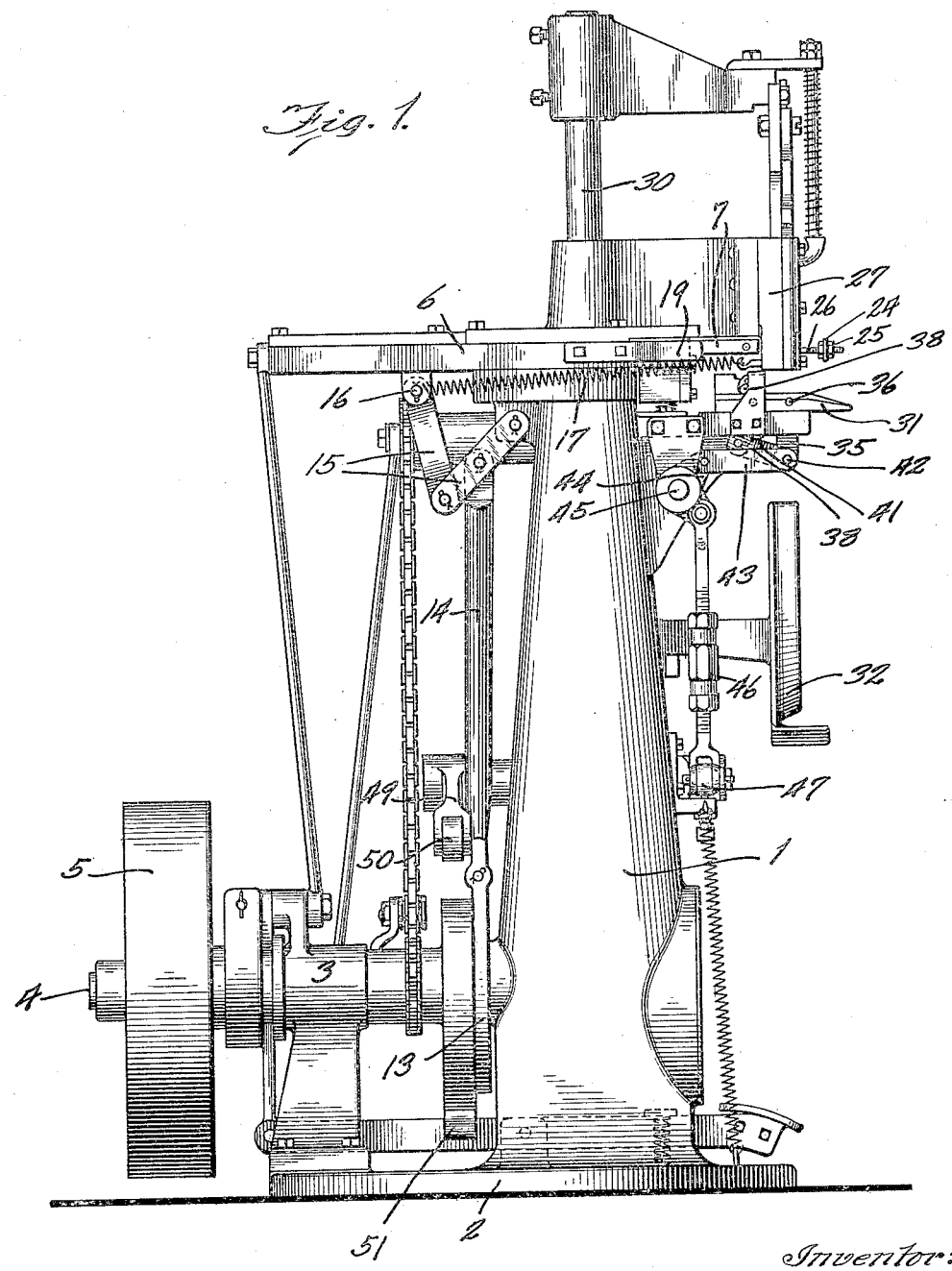

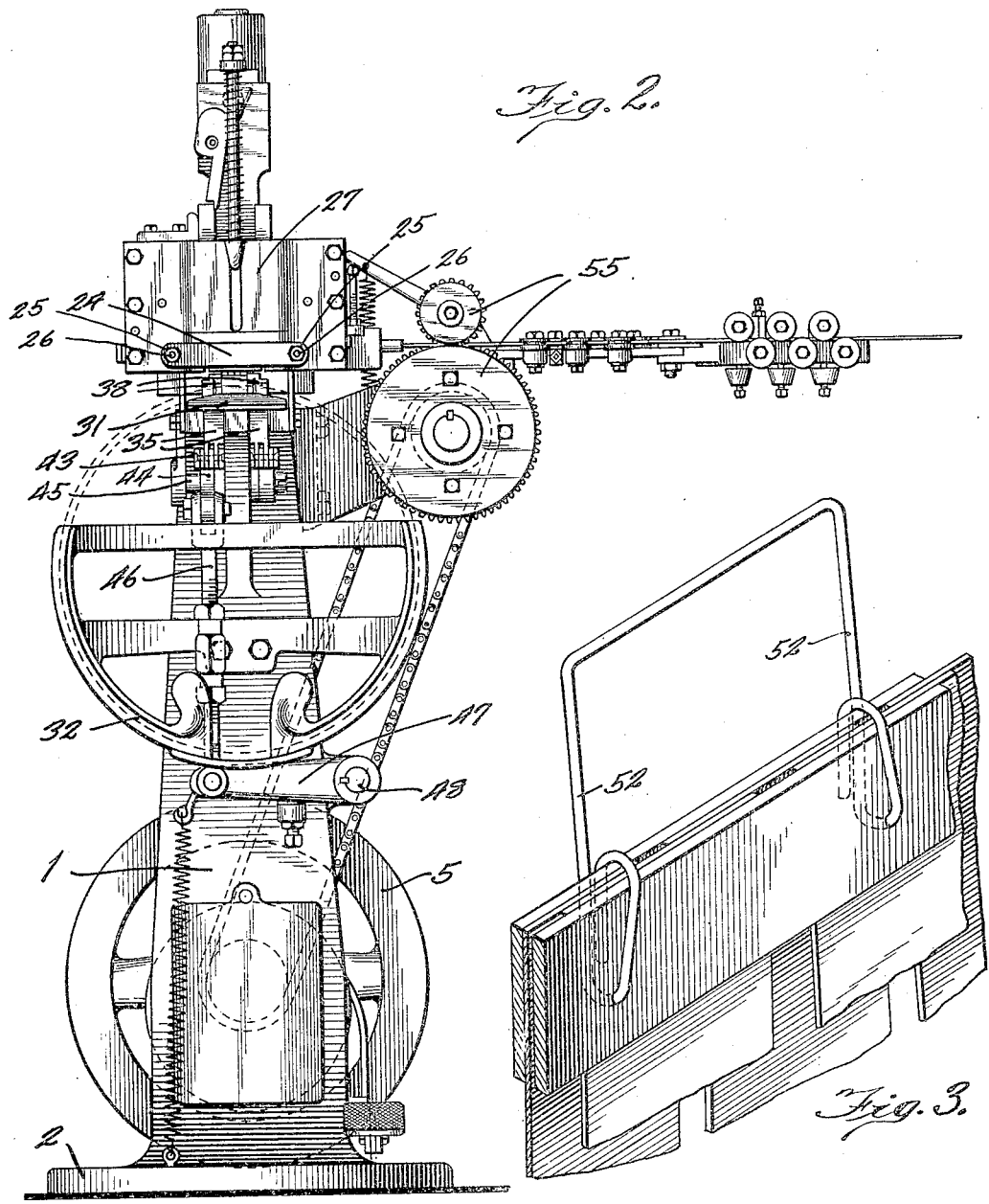

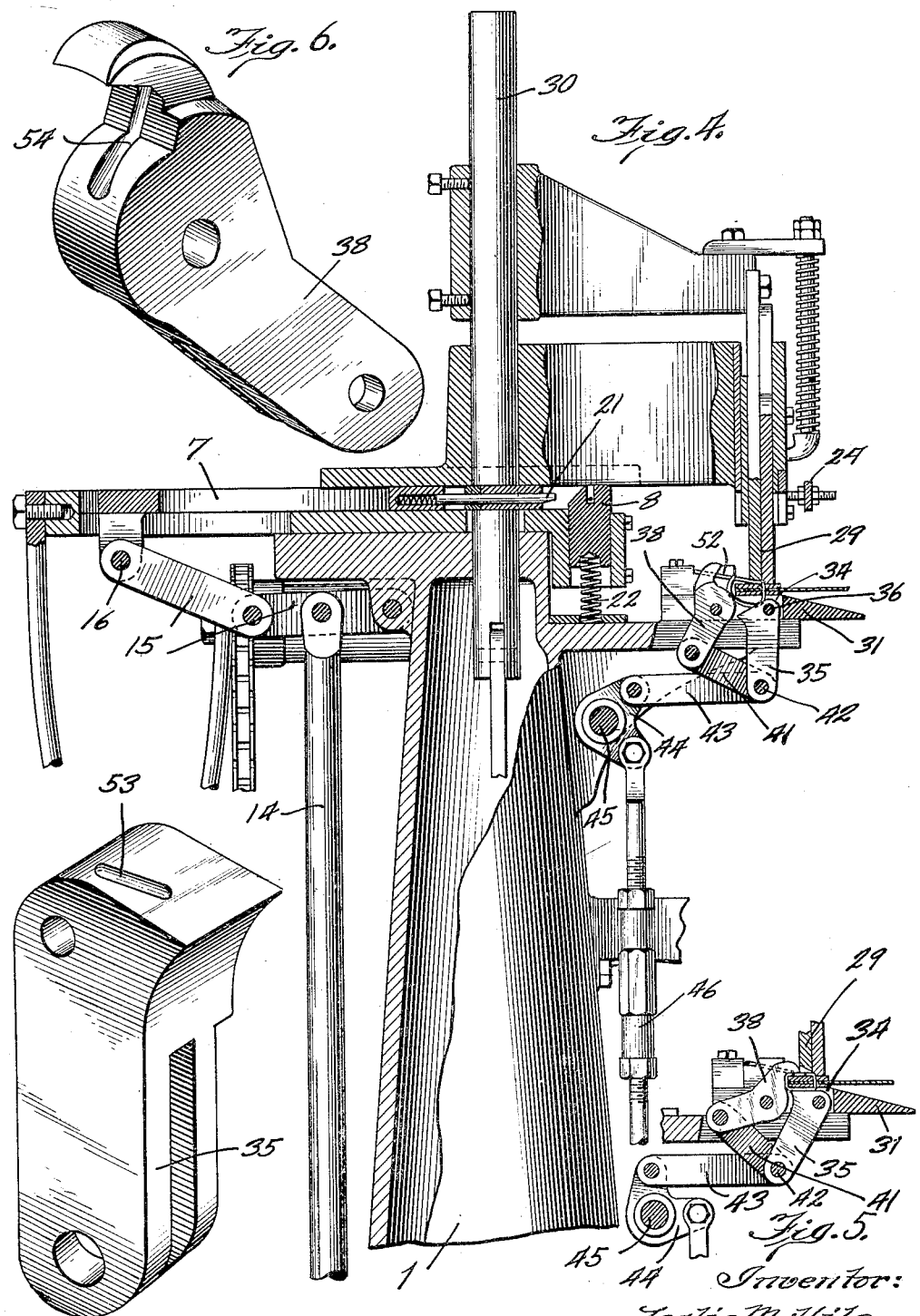

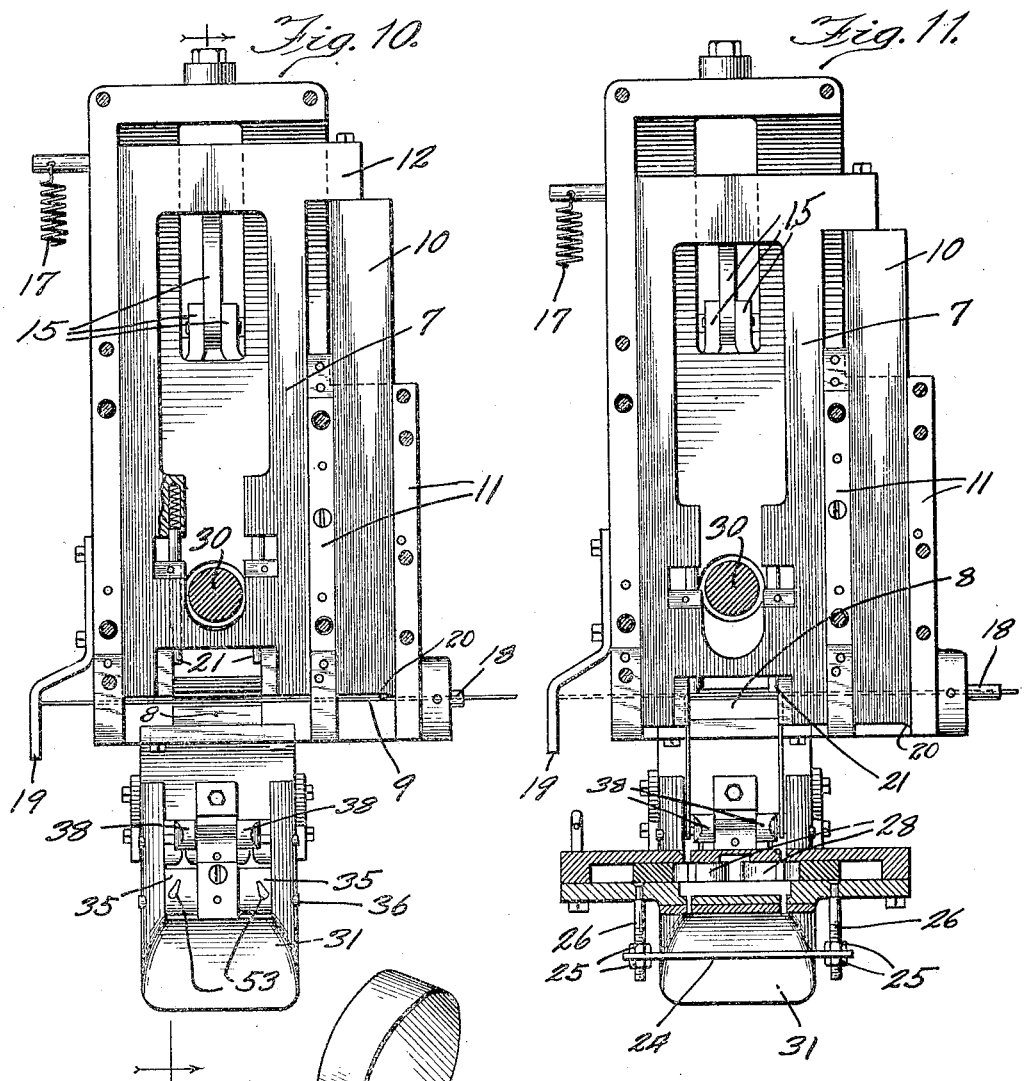

May 2, 1933. L. M. HILE 1,906,795
MACHINE FOR MAKING AND INSERTING BASKET HANDLES
Filed Sept. 8, 1931 7 Sheets-Sheet 6

Inventor:
Leslie M. Hile
By Arthur F. Durand
Atty.

May 2, 1933.  L. M. HILE  1,906,795
MACHINE FOR MAKING AND INSERTING BASKET HANDLES
Filed Sept. 8, 1931   7 Sheets-Sheet 7

Inventor:
Leslie M. Hile
By Arthur F. Durand
Atty.

Patented May 2, 1933

1,906,795

UNITED STATES PATENT OFFICE

LESLIE M. HILE, OF BENTON HARBOR, MICHIGAN

MACHINE FOR MAKING AND INSERTING BASKET HANDLES

Application filed September 8, 1931.  Serial No. 561,682.

This invention relates to machines for making and attaching wire handles to baskets, and more particularly to those for the attachment of wire handles to bushel or half-bushel baskets.

Generally stated, the object of the invention is to provide a novel and improved construction and arrangement whereby the ends of the wire handle are inserted through the rim of the basket and bent upwardly over the upper edge of the rim, and then against the side of the rim, whereby the handles are not likely to work loose in the rim of the basket, and are not likely to injure the fruit or other contents of the basket, when the handles are moved outward and then back again and manipulated in certain ways, as for the purpose of securing a basket cover in place.

It is also an object to provide certain details and features of construction and combinations tending to increase the general efficiency and the desirability of a basket handle machine of this particular character.

To the foregoing and other useful ends, the invention consists in matters hereinafter set forth and claimed, and shown in the accompanying drawings in which—

Fig. 1 is a side elevation of a basket handle machine embodying the principles of the invention.

Fig. 2 is a front elevation of said machine.

Fig. 3 is a perspective of a wire handle made and applied by said machine, showing the adjacent portion of the basket.

Fig. 4 is a vertical section of said machine.

Fig. 5 is a detail sectional view, showing the clinch blocks shown in Fig. 4, in different positions.

Figs. 6 and 7 are perspectives of the said clinch blocks, on a larger scale.

Fig. 8 is a perspective of the basket support in which the clinch blocks are pivoted, showing said blocks in their normal positions.

Fig. 9 is a similar view showing the clinch blocks in their operative positions.

Fig. 10 is a plan view of said machine, with certain elements or parts omitted, for convenience of illustration, showing the mechanism for cutting off a length of wire and bending it into bail-shaped form, showing the parts in their normal positions.

Fig. 11 is a similar view showing the parts in different positions.

Fig. 12 is a perspective of one of the elements of the bail-forming mechanism.

Figure 13:
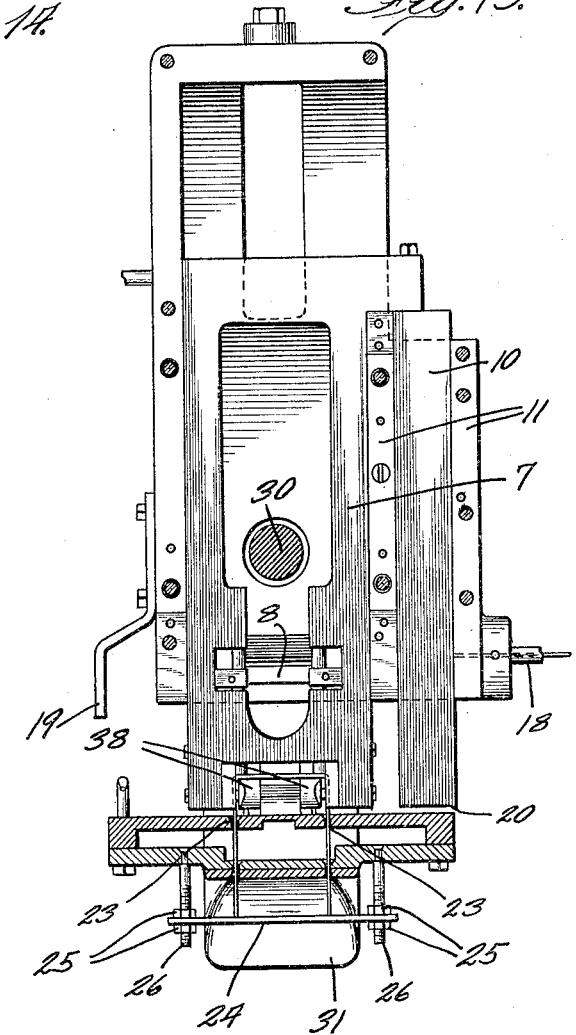
Fig. 13 is a view similar to Fig. 11, showing the parts in different positions.
Figure 16:
Fig. 16 is a side elevation of the length of wire from which the bail-shaped wire blanks are made, preliminary to forming the handles from this blank.
Figure 17:
Fig. 17 is a perspective of a bail-shaped wire blank formed from the said straight length of wire.
Figure 18:
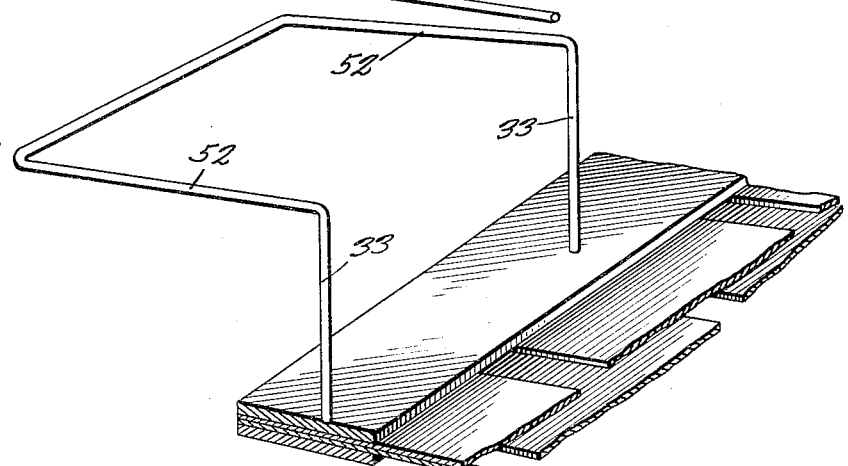
Fig. 18 is a perspective showing the next step in the formation of the handle, showing the handle ends bent at right angles for insertion through the basket rim.

As thus illustrated, the invention comprises a machine body or pedestal 1 mounted on a base 2, which latter has a bracket bearing 3 for the main driving shaft 4, from which latter the different elements of the machine are operated, a pulley 5 being mounted on said shaft to communicate power thereto. The forming mechanism 6, mounted horizontally at the top of the pedestal 1, is for the purpose of making the bail-shaped blanks, of the kind shown in Fig. 17 of the drawings, and comprises a horizontally reciprocating plate 7 which is shaped to function with a bail former, in co-operation with the so-called loop bar 8, as shown in Fig. 4 of the drawings. However, inasmuch as the handle to be formed by this machine involves the use of an additional amount of wire for each handle, in order that the handle ends may be bent over the edge of the basket rim, it follows that the plate or bail former 7 is not formed to cut off the length of wire 9, when fed into the machine, as shown in Fig. 10 of the drawings. To the contrary, the cutter 10 reciprocates horizontally in guides 11, the rear end of this cutter being secured to the projection 12 on the rear end of the bail former. The bail former plate 7 is reciprocated by a cam or eccentric device 13 on the shaft 4, through the medium of the rod 14 and the toggle links 15, which latter are secured to the under side of said plate at 16, as shown more clearly in Fig. 4 of the drawings. The spring 17 is connected in the manner shown, to assist in pulling the plate 7 forward. The wire 9 is fed through the tube 18, across the path of the cutter 10, and across the path of the bail former plate 7, and finally stops with its end against the stop 19 at the other side of the bail-forming mechanism. The cutter edge 20, acting in conjunction with the end of the tube 18, shears off the wire, and the bail former plate 7 then co-operates with the anvil or loop-bar 8 to bend the straight length of wire into bail-shaped form, as shown in Fig. 11 of the drawings. The spring-pressed pins 21 then engage the bail, as shown in Fig. 11, and the plate 7 forces the anvil 8 downward against the pressure of the spring 22, and the ends of the wire handle blank thus formed pass forward through the openings 23 in the casing of the handle driving mechanism, until these handle ends engage the stop bar or bracket 24 at the front of the said handle driving mechanism, as shown in Fig. 13. By means of nuts 25 on the screws 26, this bar 24 is adjustable to accurately position the handle blank in the handle driving mechanism 27, which latter may be of any suitable known or approved character, mechanism of this kind being common and well-known. Incidentally, Fig. 12 shows in perspective one of the so-called loop-bars 28, which are common and well-known in handle driving mechanism of this kind, and which co-operate with the handle driver 29 to bend the handle ends in the manner shown in Fig. 18 of the drawings. The said handle driving mechanism 27 is operated by the vertically reciprocating rod 30, in the well-known manner, through the medium of cam or eccentric means (not shown) within the base of the pedestal 1, on the shaft 4 previously mentioned.

At the front of the machine there is a basket support 31 upon which the rim portion of the basket is supported directly underneath the handle driving mechanism 27, in position to properly receive the handle. The lower portion of the basket is supported by the support 32, whereby the basket is held steady, with its axis in horizontal position, during the insertion of the handles. It will be understood that when the first handle is inserted, the basket is then turned around to bring the other side of the basket into position to receive the second handle.

Figure 19:
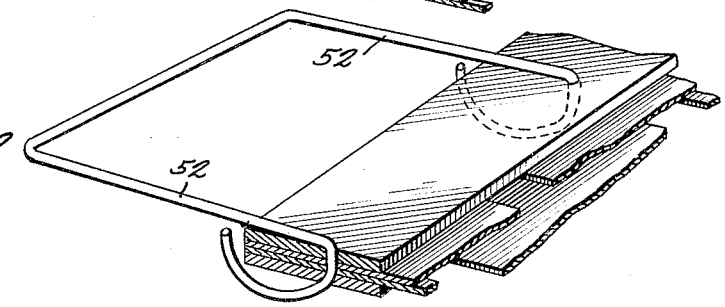
Fig. 19 shows the next step in attaching the handle.
Figure 20:
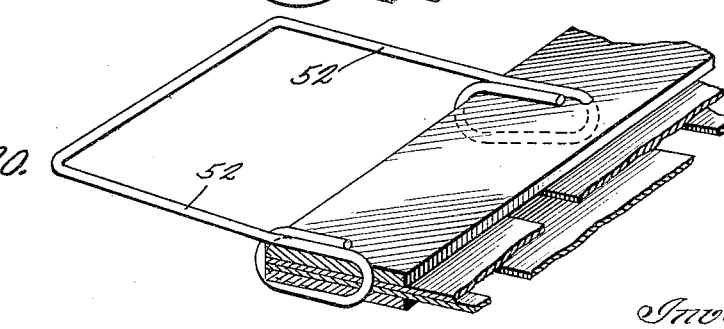
Fig. 20 shows the final step in the process of attaching the handle.

The clinching mechanism, which is especially adapted in this case to clinch the handle ends in the manner shown in Figs. 3, 19, and 20, is operative to receive the right-angle end portions 33 and partially bend them as shown in Fig. 19 of the drawings. The said mechanism is then operative to complete the clinching in the manner shown in Figs. 3 and 20 of the drawings, and for this purpose the said clinching mechanism is constructed and operated as follows: The support 31 is provided with parallel slots 34 in which the clinchers 35 are pivoted on the pin 36 inserted through the basket support. Each clincher 35 is provided with a groove 37 at the top thereof, to receive the wire end portion and deflect it toward the edge of the basket rim, as shown in Fig. 4 of the drawings. Clinchers 38 are also pivoted in said slots 34, being each provided with a portion 39 to receive and deflect the wire over the edge of the basket rim, and with a final clinching portion 40 for flattening the end portion of the wire against the outer side of the basket rim, as shown in Figs. 3, 5, and 20 of the drawings. With this arrangement, therefore, there are clinchers 35 and 38 allotted to each end portion of the handle, each clincher 35 being adapted to co-operate with its associated clincher 38 to clinch one end portion of the handle around the edge of the basket rim. Each clincher 35 is connected to its associated clincher 38 by a link 41, and the common pivot 42 of the clinchers 35 and the links 41 is connected by a link 43 with the bell crank 44, which latter is pivoted on the machine body at 45, and the other end of the bell crank is connected to the upper end of a vertically reciprocating rod 46, which latter is in turn connected at its lower end to the arm 47 on the rock shaft 48, the rear end of which rock shaft has an arm 49 provided with a roller 50 for engagement with the cam 51 on the shaft 4, whereby the clinching mechanism is operated in properly timed relation to the other elements of the machine. With this construction and arrangement, the clinching mechanism is operative to bend the inner end portions of the handle upwardly and over the edge of the basket rim, and then downwardly and against the outer side of said rim.

It is obvious, however, that by slight changes in the clinchers the handle ends can be bent outside of the legs or side portions 52 of the handle, instead of inside thereof, and in Figs. 6 and 7 clinchers corresponding to the clinchers 35 and 38 are shown, but with slightly different grooves 53 and 54, these grooves being operative to bend the wire over the edge of the basket rim and then down outside of the legs or side portions of the handle. But otherwise the operation and functions of the clinchers are the same as previously described.

It will be understood that any suitable wire feeding mechanism, such as the feed rolls 55, can be employed for feeding the wire to the handle forming mechanism 6, in front of the handle former 7, wire feeding mechanism of this kind being common and well-known.

Figure 14:
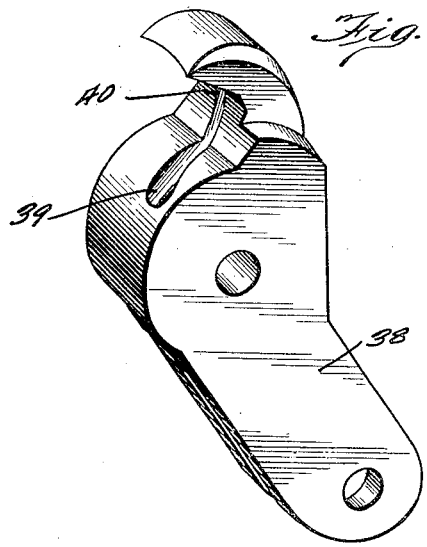
Figs. 14 and 15 are detail perspective views.
Figure 15:
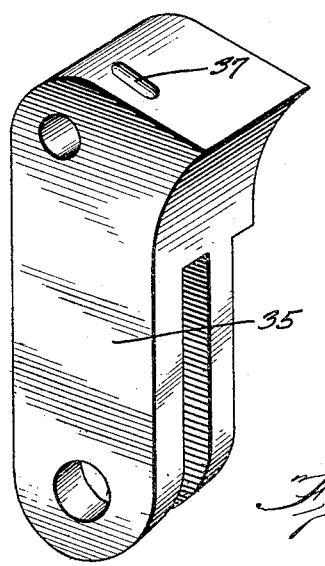

Thus in either form of the invention, using either the clinchers shown in Figs. 6 and 7, or the clinchers shown in Figs. 14 and 15, the wire is bent around over the basket rim edge and against one side of the basket rim. Preferably, this one side of the basket rim is the outer side thereof, but the handle may be inserted outwardly through the basket, and the wire ends then bent against the inner side of the basket rim, without departing from the spirit of the invention. As shown, the clinching mechanism is adapted in effect to enter the basket and operate therein, about axes extending at right angles to the axis of the basket, but if the basket is held with its lower side on the supporting member 31, the clinching mechanism will then operate externally of the basket, so that the handle ends will be clinched against the inner side of the basket rim, instead of against the outer side thereof.

Moreover, while the clinching mechanism shown and described is illustrated on a machine for attaching one handle at a time, it will be understood that the invention is not limited to this particular use, but may be employed in duplicate, if necessary or desirable, to attach both handles at the same time.

What I claim as my invention is:

1. In a machine for attaching wire handles to baskets, by bending the wire into bail-shaped form and thereafter inserting the handle ends through the basket rim, the combination of means for supporting the basket in position to have the handle ends inserted through the basket rim, clinchers for deflecting the handle ends toward the upper edge of the basket rim, during the insertion of the end portions through the rim, and other clinchers operable after said insertion for then deflecting the end portions over the upper basket rim edge and then down against one side of the basket rim.

2. A structure as specified in claim 1, comprising means for pivotally mounting all of said clinchers, and instrumentalities for actuating said clinchers in timed relation to bend the wire over the basket rim in the desired manner.

3. A structure as specified in claim 1, said clinchers being pivoted in a portion of said basket supporting means, with the first set of clinchers in position to bend the handle ends flatwise against the inner side of the basket rim, and with said last mentioned clinchers in position to bend the wire over the basket rim edge and then flatwise against the outer side of the basket rim.

4. A structure as specified in claim 1, comprising a handle driver having a handle former having an auxiliary wire cutter, whereby to provide an extra length of wire at each end of the handle, to be bent over the basket rim in the desired manner.

5. A structure as specified in claim 1, comprising links for connecting said first-mentioned clinchers with said second-mentioned clinchers, and instrumentalities having a link connected to said first-mentioned clinchers, whereby to actuate all of said clinchers in properly timed relation.

6. A structure as specified in claim 1, said first-mentioned clinchers having pivoted end portions provided with grooves to initially deflect the wire ends against the basket rim, said second-mentioned clinchers having portions to deflect the wire across the basket rim edge, and having normally upstanding portions adapted to move forward and finally bend the wire ends against the side of the basket rim.

7. A structure as specified in claim 1, said second-mentioned clinchers being operative to bend the wire ends into positions between the legs or side portions of the handle.

8. A structure as specified in claim 1, said second-mentioned clinchers being operative to bend the wire ends into positions between the legs or side portions of the handle, with the said wire ends substantially against the inner sides of said legs or side portions.

9. A structure as specified in claim 1, said basket supporting means being adapted to support the basket in position to have the handle inserted inwardly through the basket rim, whereby said clinchers are then operative to bend the wire ends over the basket rim edge and downwardly to positions against the outer side of the basket rim.

10. A structure as specified in claim 1, said basket supporting means comprising a member against which the basket rim is placed to receive the basket handle, said member having slots in which said clinchers are pivoted, together with instrumentalities for actuating said clinchers in properly timed relation, thereby to bend the wire ends in the desired manner.

11. A structure as specified in claim 1, said clinchers having parallel axes extending at right angles to the axis of the basket, together with instrumentalities for actuating said clinchers about their said axes.

12. A structure as specified in claim 1, said basket supporting means being adapted to permit adjustment of the basket thereon, after the insertion of the first handle, thereby to receive the second handle.

13. In a machine for attaching wire handles to baskets, by bending the wire into bail-shaped form and thereafter inserting the handle ends through the basket rim, the combination of means for supporting the basket in position to have the handle ends inserted in the basket rim, clinchers for deflecting the handle ends toward the edge of the basket rim, and other clinchers for then deflecting the wire ends over the basket rim edge and against one side of the basket rim, said first-mentioned clinchers having pivoted end portions provided with grooves to initially deflect the wire ends against the basket rim, said second-mentioned clinchers having portions to deflect the wire across the basket rim edge, and having normally upstanding portions adapted to move forward and finally bend the wire ends against the side of the basket rim.

14. In a machine for attaching wire devices to basket rims, by bending wire into bail-shaped form and thereafter inserting the wire end-portions through the basket rim, the combination of means for inserting the wire end portions through the rim, to provide projecting end portions, devices for bending the projecting end portions flatwise against one side of the rim, and other devices for bending the wire end portions tightly against the upper edge of the rim and flatwise against the other side of the rim.

15. A structure as specified in claim 14, said inserting means being adapted to press the two side portions of the fastening device against said other side of the rim, prior to the complete operation of said devices.

16. A structure as specified in claim 14, said devices being operative and disposed in position to locate the final end portions of the wire against the inner sides of the two side portions of the bail-shaped device.

17. A structure as specified in claim 14, said devices being operative and disposed in position to locate the final end portions of the wire parallel with and against the sides of the two parallel side portions of the bail-shaped device.

Specification signed this 2d day of Sept., 1931.

LESLIE M. HILE.